United States Patent Office 3,369,003
Patented Feb. 13, 1968

3,369,003
POLYMERS OF TERTIARY-ALKOXYALKYL ESTERS
Joseph A. Verdol, Dolton, Ill., assignor to Sinclair Research, Inc., New York, N.Y., a corporation of Delaware
No Drawing. Continuation-in-part of application Ser. No. 202,963, June 18, 1962. This application Sept. 20, 1963, Ser. No. 310,474
5 Claims. (Cl. 260—78.5)

This invention is a novel composition of matter; namely, vinylene-type copolymers and homopolymers of tertiary-alkoxyalkyl esters of olefinically unsaturated carboxylic acids, and a novel method for their preparation. By "vinyl" or "vinylene-type" polymers is meant polymers formed by addition polymerization at the double bond of the monomer. The polymers of this invention may be readily converted into polymers having hydroxyalkyl side chains. The polymers are useful as coating compositions, adhesive and laminating compositions, synthetic rubbers, films, fibers and in other related applications. The polymers may be formed as beads by suspension polymerization, in which form they are especially suitable for molding to yield foamed polymers, as described in my copending application Ser. No. 310,492, filed of even date herewith. The foaming process is accomplished by causing decomposition of tertiaryalkoxyalkyl to tertiary olefin gas which acts as a blowing agent, and cross-linking of the hydroxyl residues remaining. Such polymer beads may contain, besides the polymer, other material usable in the foaming reaction, e.g. cross-linking agents and catalysts.

Polymers having hydroxyalkyl side chains offer numerous advantages, especially for cross-linking, because of the wide spectrum of cross-linking reactions which can exploit a hydroxyl group. Thus, the hydroxyalkyl polymers can be cross-linked by esterification, etherification, urethane reactions, etc., and the cross-linking need not occur during the original polymerization. The use of this invention to prepare polymers having hydroxyalkyl side chains has many advantages over the introduction of hydroxyalkyl groups into polymer systems by polymerization or copolymerization of a monomer containing hydroxyalkyl groupings. For example, it is usually quite difficult and expensive, especially in the case of unsaturated dicarboxylic acids, to prepare hydroxyalkyl esters in pure form, owing to the formation of undesired polymeric products. Even in the case of unsaturated monocarboxylic acids, it is often difficult to prepare pure hydroxyalkyl esters, owing to side reactions which result in diester formation. If relatively pure hydroxyalkyl esters are not employed for polymerization, the resulting polymer will often become cross-linked and insoluble during polymerization and will, therefore, be useless for coatings, laminating resins, etc., where cross-linking is undesired until after the coating or laminating formulation has been applied to the coating or laminating surfaces. Furthermore, the hydroxyalkyl monomer being polymerized can react prior to or during polymerization with the catalyst or with other functional groups of the system, which often results in inhibition of polymerization or in a deleterious change in the properties of the final polymer. On the other hand, if potential hydroxyalkyl groups are introduced into the polymer system by homopolymerizing or copolymerizing a tertiaryalkoxyalkyl ester one does not encounter the difficulties cited above. Since the hydroxyalkyl groups are blocked, that is, exist as tertiaryalkoxyalkyl groups during polymerization, there need be little concern about side reactions with most polymerization catalysts or with other functional groups of the system.

Polymers according to this invention contain the residue of a tertiaryalkoxyalkyl ester of an olefinically unsaturated carboxylic acid. The acid group generally is of about 3 to 40 or to 43 carbon atoms. This ester residue usually appears as the repeating group

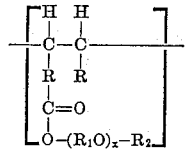

where R is a hydrocarbon radical, preferably unsubstituted. R is of 0–40 or more carbon atoms, preferably 0 to 20 carbon atoms, aromatic, straight, branched or cyclic aliphatic; it may be saturated or olefinic and may be substituted with other materials or radicals which do not interfere with reactions or the uses of the finished material; it is generally part of the hydrocarbon residue of a carboxylic acid.

$R_1$ is a divalent aliphatic hydrocarbon radical, for example, alkylene, of 2 to 12, preferably 2 to 8 carbon atoms. This radical can be saturated, olefinic, substituted (even with inorganic materials such as silicon or boron), or unsubstituted, straight, branched or cyclic aliphatic. Ordinarily, $R_1$ is the saturated hydrocarbon residue of a glycol and for a simple glycol residue the value of $x$ is 1. Where $x$ is a number greater than 1, the radical $—(R_1O)—$ is the residue of a polyglycol or ether glycol such as polyethylene glycol, etc. Preferably, $x$ is 1 to 5 although it may be up to about 25 or more. $R_2$ is a tertiary alkyl radical of 4 to 10, preferably 4 to 7, carbon atoms and is usually derived from a tertiary olefin. The tertiary radical has its valence bond to the $—(R_1O)_x—$ group at a tertiary carbon of the $R_2$ group. $R_3$ is a hydrogen or monovalent organic radical, generally hydrocarbon or carboxyl. $R_3$ often is lower alkyl, advantageously of 1 to 4 carbon atoms, but it may have up to 40 or more carbon atoms, and be aromatic, straight, branched or cyclic aliphatic, saturated or olefinic, and unsubstituted or substituted with non-deleterious components. $R_3$ also may frequently be another

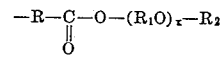

or a closely related group. In addition the H positions of the repeating group may sometimes be occupied by various radicals, especially lower alkyl radicals, say, of 1 to 4 carbon atoms.

As mentioned, polymers embodying this invention may be simple homopolymers having the repeating tertiary-alkoxyalkyl (T) group

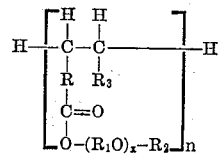

or the polymer may be a copolymer in which the T group is interspersed with other vinyl-type groups, which may sometimes be other tertiaryalkoxyalkyl ($T^1$) groups, or unrelated (U) groups. The copolymer may be of the alternating type, for example

—T—U—T—U— or may be a block copolymer such as

—T—T—T—T—T¹—T¹—T¹—T¹—

Graft copolymers such as

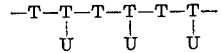

are also included within the scope of this invention. Polymers according to the instant invention are usually solids at ambient temperatures and have average molecular weights of about 500 to several million, say, up to about two million or more. Often the polymer will have an average molecular weight of about 100,000 to 500,000. The T and T¹ groups will comprise at least about 1% by weight of the polymer, usually about 5, 15 or 25 to 75% by weight. Unrelated (U) groups may therefore comprise up to about 99% of the copolymers, for instance about 25 to 75, 85 or 95%.

Polymers according to this invention are usually formed by polymerization of the tertiaryalkoxyalkyl ester monomer $$R-\underset{H}{C}=\underset{H}{C}-R-\underset{\underset{O}{\|}}{C}-O-(R_1O)_x-R_2$$

As will be apparent to those skilled in the art, the polymerization feed may comprise 1 to 100% of this monomer, the essential balance comprising other vinyl-type compounds, that is, olefinic copolymerizable hydrocarbons, etc., needed to give the desired copolymer. Such hydrocarbons generally have their olefinic unsaturation in the α position.

The monomer, in turn, can be made by esterifying the unsaturated carboxylic acid material $$R_3-\underset{H}{C}=\underset{H}{C}-R-\underset{\underset{O}{\|}}{C}-O-$$

with tertiaryalkoxy-alkanol of the formula $$R_2-(OR_1)_x-OH$$

This acid material may be any suitable material which contains one or more unsaturated carbon bonds and one or more acid functionalities, that is, the "non-oxo carbonylic" (acid, ester, chloride or anhydride) group characterized by the $$-\underset{\underset{O}{\|}}{C}-O-$$

configuration. Preferably the unsaturation is mono-olefinic and, as mentioned, is usually in the α position. The ester is formed from the acid material and tertiaryalkoxyalkanol by addition and esterification in the case of the anhydride, esterification in the case of the free acid or the chloride, and transesterification in the case of other esters. The tertiary alkoxyalkanol is generally used in the amount sufficient to esterify all the available $$-\underset{\underset{O}{\|}}{C}-O-$$

groups. Such an amount, in the case of a monocarboxylic acid material is, of course, at least an equimolar amount and in the case of a dicarboxylic acid material, that is, where $R_3$ is or contains a carboxy group, is at least twice the molecular amount of acid material, etc.

Direct esterification with the ether alcohol may be catalyzed or non-catalyzed and may be conducted in the absence or presence of an inert solvent such as toluene or xylene, which removes the water formed during the esterification reaction as an azeotrope. Conventional esterification catalysts such as sodium bisulfate, sulfonic acids, sulfuric acid, phosphoric acid, cationic resin catalysts, etc., may be employed but, since these materials have a tendency to decompose some of the tertiaryalkoxy-alkanol, non-catalyzed procedures are preferred when direct esterification is to take place. Preferred temperatures for direct esterification are about 100 to 150° C.

Transesterification or ester interchange is employed to convert other esters of the carboxylic acid to the tertiaryalkoxyalkanol esters and in such circumstances the stoichiometric amount of the tertiaryalkoxyalkanol needed to esterify every carboxyl group of the acid material is preferably reacted in order to obtain a pure product. The ester interchange reaction may be carried out in the presence of the acid catalysts mentioned above, but preferably the reaction uses a basic or at least less acidic catalyst than employed in direct esterification. Effective catalysts are tetraisopropyl titanate, tin oxalate, dibutyl tin oxide, lead oxide, zinc stearate or manganous acetate. The alkali metals may be used and may be in the form of their alcoholates, prepared separately or in situ by adding small amounts of the alkali metals to the t-alkoxyalkanol. Alkali metal hydrides such as calcium, sodium, magnesium and lithium hydrides are also suitable catalysts. The ester interchange reaction is normally carried out at about the reflux temperature of the reaction mixture at atmospheric pressure, but may be conducted at reduced pressure if desired. Preferred temperatures are in the range of about 100 to 200° C., although the temperature may reach about 275° C. or more.

As mentioned, acid catalysts, especially strong-acid catalysts, are preferably avoided in order to obviate internal reactions of the ether-alcohol. Catalyst concentrations for catalyzing both esterification and ester interchange reactions are usually in the range of about 0.01 to 2%. After the reaction is complete the tertiaryalkoxyalkyl esters may be separated from the reaction mixture using the solvents mentioned above. Other common methods of purification, such as sublimation, crystallization, distillation, extraction, etc., may also be employed if desired.

Typical carboxylic acids which may be used to provide the $$R_3-\underset{H}{C}=\underset{H}{C}-R-\underset{\underset{O}{\|}}{C}-O-$$

group in accordance with this invention are acrylic and substituted acrylic acids such as crotonic and other butenic acids, maleic acid, itaconic acid, fumaric, maleic, citraconic, oleic, ricinoleic, linoleic, linolenic, dimethyl vinyl acetic acids, etc. As mentioned, the inner or outer anhydrides of these acids are usable as well as the acyl chlorides or the mono- or polyesters of these acids. When a fully esterified acid derivative is to be converted to the tertiaryalkoxyalkyl ester by ester interchange, the ester group is preferably lower alkyl, to provide for removal of the alcohol of decomposition by vaporization during the ester interchange.

Mono- and dicarboxylic mono-unsaturated acids of 3 to 12 carbon atoms and their diesters with lower alkanols, are the preferred acid starting materials to produce the preferred esters for polymerization. Where the $R_3$ group is an ester group different from the $$R_2-(OR_1)_x-O-\underset{\underset{}{\overset{O}{\|}}}{C}-$$

radical, the $R_3$ substituent can be added to the acid functionality by esterification before the resulting material is esterified with the tertiaryalkoxyalkanol. Even before this "unbalancing" esterification, however, it is advisable first to esterify the acid group which is later to be reacted with the tertiaryalkoxyalkanol with a simple low molecular weight alcohol such as methanol, which later is removed in transesterification.

The tertiaryalkoxyalkanol, $R_2-(OR_1)_x-OH$, is generally prepared by etherification of the glycol $$H(OR_1)_xOH$$

with a tertiary olefin, that is, an olefin having a double bond at its tertiary carbon atom, as described in my copending application Ser. No. 177,747, filed Mar. 6, 1962, and now Patent No. 3,288,842. This etherification reaction may be conducted using a cationic exchange material in the hydrogen form and in an amount sufficient to catalyze the selective conversion to the tertiary alkyl monoether. Among the ion exchange materials useful for this reaction are relatively high molecular weight water-insoluble resins or carbonaceous materials containing an $SO_3H$ functional group or a plurality of such groups. These catalysts are exemplified by the sulfonated coals (Zeo-Karb H, Nalcite X, and Nalcite AX) produced by the treatment of bituminous coals with sulfuric acid, and commercially marketed as zeolitic water softeners or base exchangers. These materials are usually available in a neutralized form, and in this case must be activated to the hydrogen form by treatment with a mineral acid, such as hydrochloric acid, and water washed to remove sodium and chloride ions prior to use. Sulfonated resin type catalysts include the reaction products of phenol-formaldehyde resins with sulfurc acid (Amberlite IR–1, Amberlite IR–100, and Nalcite MX). Also useful are the sulfonated resinous polymers of coumarone-indene with cyclopentadiene, sulfonated polymers of coumarone-indene with furfural, sulfonated polymers of coumarone-indene with cyclopentadiene and furfural and sulfonated polymers of cyclopentadiene with furfural. The preferred cationic exchange resin is a strongly acidic exchange resin consisting essentially of a sulfonated polystyrene resin, for instance a divinylbenzene cross-linked polystyrene matrix having about 0.5 to 20 percent, preferably about 4 to 16%, divinylbenzene therein to which are attached ionizable or functional nuclear sulfonic acid groups. This resin is manufactured and sold commercially under various trade names, e.g. Dowex 50, Nalcite HCR, Permutit Q. This resin, as commercially obtained, has a moisture content of about 50% and it can be used in the etherification process in this form or it can be dried and then used with little or no differences in results ascertainable. The resin can be dried as by heating at a temperature of about 212° F. for 12 to 24 hours or the free water can be removed as by refluxing with benzene or similar solvents and then filtering. The catalyst concentration range should be sufficient to provide the desired catalytic effect, e.g. between about 0.5 and 50% (dry basis) by weight of the reactants, with the preferred range being between about 5 to 25% (dry basis), for example 10%. A weight hourly space velocity of about 1 to 8 (based on hydrocarbon feed) and up to about 17 based on total hydrocarbon and glycol may be used with advantage. The WHSV can be about 0.1 to 100 based on hydrocarbon feed only, with the preferred WHSV being about 2 to 20.

The ether-alcohol can be formed by reacting the tertiary olefin with about 0.1 to 100 moles of the glycol per mole of tertiary olefin, the usual amount being between about 0.5 to 5 moles of glycol per mole of tertiary olefin. The reaction, for example in the case of isobutylene and ethylene glycol, can proceed as follows:

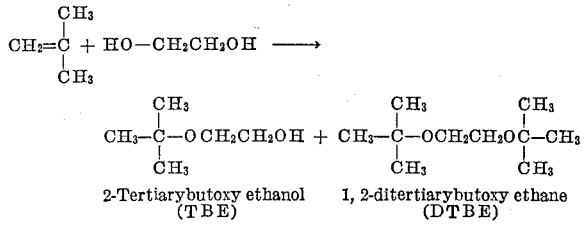

2-Tertiarybutoxy ethanol (TBE)    1, 2-ditertiarybutoxy ethane (DTBE)

The tertiary alkanol ethers of the following glycols and polyols may be used, for example: ethylene glycol, diethylene glycol, polyethylene glycols, propylene glycol, polypropylene glycols, mixed ethers of ethylene and propylene glycols, butylene glycols, 1,5-pentanediol, 2-ethylhexane-1,3-diol, 1,10-decane diol, trimethylol propane, glycerine, neopentyl glycol, and pentaerythritol. In the case of diols, the monotertiaryalkyl ether is employed for esterification. However, in the case of triols, tetraols and higher polyols, it is possible to use mono-, di-, or tritertiaryalkyl ethers, so long as at least one free OH group is available for esterification. It is also possible to use tertiaryalkyl ether derivatives of polyols which contain inorganic atoms, such as boron, silicon, aluminum, tin, lead, etc. Ethers representative of those which may be employed to form the usable esters are:

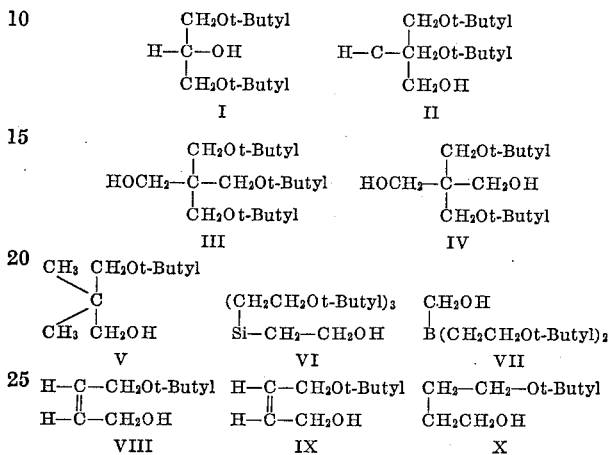

The ether-esters used in this invention may also sometimes be prepared by esterifying one hydroxyl of the glycol with the acid before etherification of the other hydroxyl with tertiary olefin, but this procedure applied to polycarboxylic acid may lead to reaction products containing mixed short-chain polyesters which are desirably avoided.

The novel polymers of this invention are usually prepared by the reaction of monomers having olefinic, usually α-olefinic, unsaturation, at least some of which monomers have the $$-R-\underset{\underset{O}{\|}}{C}-O-(R_1O)_x-R_2$$

group to be found in the final polymer. This is the preferred method and is described in greater detail below. However, the polymer product of this invention may also be prepared by an esterification reaction between a suitable polymer having unesterified "non-oxo carbonylic" groups as above described and tertiaryalkoxyalkanol of the formula $$R_2-(OR_1)_x-OH$$

Such preparations use the esterification techniques described above, while the non-oxocarbonylic-containing polymer is prepared from unesterified monomers having such groups, using the polymerization techniques described below.

Polymerization of unsaturated esters of tertiaryalkoxyalkyl esters of carboxylic acids has been carried out employing a variety of polymerization techniques. In many cases these monomers were homopolymerized, and in other cases copolymers were prepared. Typical examples of tertiaryalkoxyalkyl esters which have been employed in accordance with the present invention are as follows:

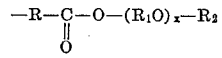

Methyl 2-tertiarybutoxyethyl maleate

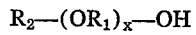

Tertiarybutoxyethyl crotonate

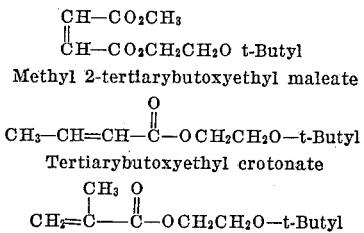

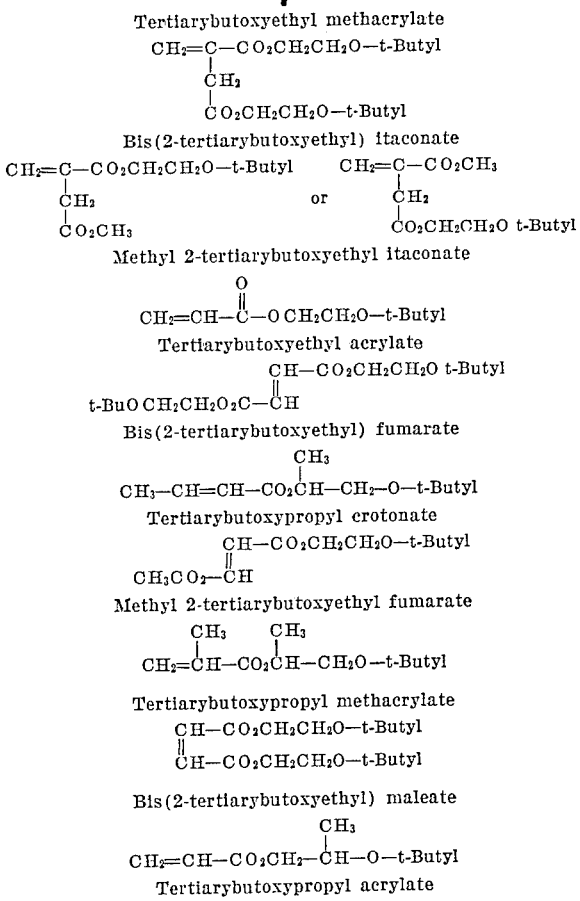

Tertiarybutoxyethyl methacrylate

Bis(2-tertiarybutoxyethyl) itaconate

Methyl 2-tertiarybutoxyethyl itaconate

Tertiarybutoxyethyl acrylate

Bis(2-tertiarybutoxyethyl) fumarate

Tertiarybutoxypropyl crotonate

Methyl 2-tertiarybutoxyethyl fumarate

Tertiarybutoxypropyl methacrylate

Bis(2-tertiarybutoxyethyl) maleate

Tertiarybutoxypropyl acrylate

These monomers may be homo or copolymerized using a variety of polymerization techniques. Thus these monomers may be polymerized or copolymerized in solution, in emulsion, in bulk, or in suspension by using a catalyst or other source of free radical polymerization initiator, for example, gamma rays from cobalt 60. Among the catalysts which may be employed are benzoyl peroxide, ammonium potassium persulfate, tertiarybutyl perbenzoate, tertiarybutyl hydroperoxide, methylethyl ketone peroxide, azobisisobutyronitrile, etc. These catalysts are generally used in an amount of about .005 to 1% by weight of the monomer.

In solution polymerization, generally a 5 to 75% solution of the monomer is employed. Preferably the solvent is one with a low chain transfer constant, such as benzene, alkylbenzenes and cyclohexane. Emulsion polymerization satisfactorily employs water and a surface-active or emulsifying agent such as sodium lauryl sulfate, sodium stearate, polyalkylene oxides, quaternary ammonium salts, etc. The emulsifying agent can be employed in the amount of about 0.5 to 5% by weight of the monomer, which itself comprises about 10 to 50% by weight of the emulsion.

In this invention suspension polymerization is preferably employed. This mode of polymerization differs from emulsion polymerization in that a strong electrolyte is included in the reaction mixture to coagulate the polymer as it forms. Therefore, when the polymerization is carried out in an aqueous medium under conditions of "suspension polymerization," it produces the desired homopolymer and copolymer, including terpolymer, etc., in the form of beads or pearls, which offer a number of manipulative advantages in handling and shipping from the standpoint of both the resin producer and the subsequent processor. The resin beads of this invention are particularly advantageous in that they may comprise the entire feedstock to foamed polymer production, the blowing agent being the tertiary olefin residue "built into" the polymer and the beads may be subsequently expanded and cross-linked by a variety of techniques.

Polymerization of the tertiaryalkoxyalkyl ester monomer generally takes place at a temperature of about 5° to 150° C., preferably 20° C. to 100° C., at a pressure from atmospheric to about 100 atmospheres or more, although when some materials, such as ethylene, are used for copolymerization, the pressure may vary from about 1000 to 10,000 p.s.i. and the temperature may be about 250 to 300° C. Generally, this reaction will require maintaining these conditions for about 1 to 24 hours, or even longer when polymerization is catalyzed by gamma rays. Such conditions are used whether a tertiaryalkoxyalkyl ester homopolymer or copolymer is formed. When a random or alternating copolymer is to be formed, the monomers are mixed before or during polymerization; to form block copolymers, a prepolymer with reactive ends is formed from one of the monomers and then the other monomer is added. Also, some monomeric materials "automatically" produce block copolymers from a mere mixture of monomers. When a graft copolymer is to be formed, a prepolymer is made having reactive sites along its length and then the other monomer is added.

The monomers which can be employed to form with tertiaryalkoxyalkyl ester monomer the polymers of this invention are materials containing the olefinic

group, and having sufficient reactivity with the T monomer to form addition polymers, that is, polymers formed by addition of monomers to each other at the site of the double bond. This reactivity may be expressed by the reactivity ratio product $r_1 r_2$ and in order for copolymers to form, the reactivity ratio product should preferably be equal to or less than unity, that is, the reciprocal of $r_1$ would be equal to or less than $r_2$. Reactivity ratios are determined on an empirical basis for each copolymer system, as follows:

$$r_1 = \frac{k_{11}}{k_{12}}$$

$$r_2 = \frac{k_{22}}{k_{21}}$$

where $k_{11}$ is the rate constant for an $m_1$ radical to react with or add to an $m_1$ monomer; $k_{12}$ is the rate constant for an $m_1$ radical to add to or react with monomer $m_2$. Likewise, $k_{22}$ expresses the rate of reaction between radical $m_2$ and monomer $m_2$ while $k_{21}$ is the rate constant for addition of an $m_2$ radical with an $m_1$ monomer.

The usable U monomers are organic materials of two or more carbon atoms having olefinic, generally α-olefinic, unsaturation. Vinylene,

and vinylidene

materials may be used, but usually the very wide availability of substituted vinyl monomers makes these materials preferred for copolymerization. Thus, although the U monomer may be vinylidene chloride, chloroprene, etc., the U monomer generally may be considered an ethylene derivative, that is, of the formula $H_2C=CHX$. Thus, vinyl chloride fits this formula, X being a halogen; where X is lower alkyl, 3,3-dimethyl-butene-1 can be used; where X is cyano, acrylonitrile can be used; where X is acetyl, the monomer is vinyl acetate; where X is phenyl, the monomer is styrene; where X is vinyl, butadiene is employed; where X is hydrogen, the monomer is ethylene; where X is methylate, methylmethacrylate is the monomer, etc. Usable vinyl monomers include also vinyl benzoate, p-chlorostyrene, 3,5-dichlorostyrene, p-methoxystyrene, vinyl pyridine, vinyl carbazole, etc., octyl acrylate, alpha-chloroacrylonitrile, dimethyl acrylamide, etc. Partial homopolymers and copolymers of these olefinic compounds may also be used as the U component. Frequently the U monomers contain about 2 or 3 to 20 or more carbon atoms, preferably up to about 12 carbon atoms.

As can be readily understood, the number of possible copolymer systems employing T and U components is large, and is limited merely to the selection of appropriate monomer systems showing favorable reactivity ratios for copolymerization. As for proportions, these are assigned in view of the properties desired in the final polymer as well as the amount of foaming, if any, desired. The polymer may frequently have about 0.01 to 10, preferably about 0.1 to 1, parts by weight of the T monomer residue for each part by weight of the U monomer residue. More often, there is about one part by weight of vinyl-type monomer residue for each 0.1 to 1 part by weight of the tertiarybutoxyethyl ester of an olefinically unsaturated alkanoic monoacid, diacid, or diacid methyl monoester of 3 to 6 carbon atoms.

The formation of a novel copolymer containing tertiaryalkoxyalkyl groups can be illustrated by the polymerization of styrene and bis(2-tertiarybutoxyethyl) fumarate to form a copolymer, say $x$ moles of styrene and $y$ moles of the fumarate ester. The copolymer formed may then be heated in an acidic solution to liberate isobutylene, which introduces hydroxyethyl groups into the polymer according to the following illustration:

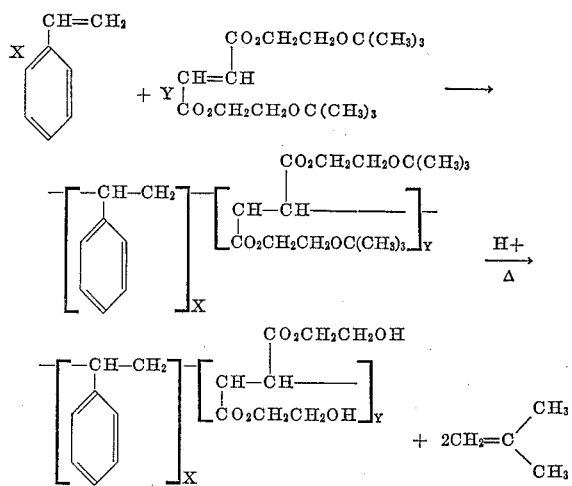

As mentioned, the copolymers and homopolymers of this invention may be prepared in bead form. Such beads prepared in accordance with the present invention are distinguished from conventional expandable polyolefin beads, e.g. polyvinylchloride or polystyrene beads, in that the expanding agent or foaming agent is, in part or wholly, a component of the polymer molecule from which the bead is prepared. Therefore, in many cases, the homopolymer or copolymer beads are rendered expandable merely by heating at an appropriate temperature by either or both catalytic and thermal procedures. The thermal and/or catalytic treatment of the beads results in the liberation of the isoolefin, usually isobutylene, from the polymer system at which time expansion of the beads may occur depending upon the pressure conditions. The hydroxyl groups generated via liberation of the isoolefin may then be cross-linked by ester interchange or other cross-linking mechanism, which usually employs a polyfunctional organic or inorganic compound, or a mixture of such compounds, and forms a more or less rigid polymer. The cross-linking agent may be any of a number of polyfunctional materials, organic or inorganic, which react, under the cross-linking conditions, to leave the divalent —Q— radical in a form suitable for bridging between the oxy oxygens of hydroxyl radicals made available by decomposition of the tertiaryalkoxyalkyl radicals on feedstock polymer chains. Desirably, the cross-linking will be performed by an esterification reaction, so that —Q— will desirably be a divalent organic or inorganic acid radical, such as is provided by the organic di- or other polycarboxylic alkanoic acids, for instance often of about 2 to 20 carbon atoms, or their acid chlorides and anhydrides; e.g. maleic anhydride, phthalic anhydride, isophthalic acid, terephthalic acid, adipoyl chloride, adipic acid, pyromellitic anhydride, succinic anhydride, succinic acid, fumaric acid, trimellitic anhydride, citric acid, etc. Included in this category, also, are the styrene-maleic anhydride copolymers, generally containing a 1:1 ratio of styrene to maleic anhydride. Other materials which react to cross-link by reaction with pendant —OH groups are arylene and alkylene diisocyanates, preferably of about 6 to 20 carbon atoms. Examples of isocyanates which may be employed are p,p'diphenylmethane diisocyanate, 2,4-tolylene diisocyanate, 2,6-tolylene diisocyanate, naphthylene diisocyanates, phenylene diisocyanates and the like. Formaldehyde, phenol formaldehyde resins, melamine formaldehyde resins, urea formaldehyde resins and other such resins can react with pendant —OH groups of the particular polymer being cross-linked. Other suitable organic cross-linking agents are commercially available epoxy resins such as Shell's Epon resins (derived from bisphenol A), Koppers' Kopoxite resins (derived from resorcinol), and FMC's Oxiron resins (derived from butadiene).

Cross-linking may also take place by the use of suitable inorganic, organometallic, or organometalloid derivatives. For example, titanium tetrachloride, titanium oxide or titanium esters such as octylene glycol titanate, tetraisopropyl titanate and related orthotitanate esters are particularly suitable for this purpose. When titanium cross-linking agents are employed, one frequently obtains additional beneficial catalytic effects, such as enhancement of isoolefin liberation from the tertiaryalkoxyalkyl-containing unit of the homopolymer or copolymer. Furthermore, titanium derivatives are efficient ester-interchange catalysts and are capable of promoting the cross-linking reaction via ester interchange. Other suitable cross-linking catalysts include stannous chloride, which yields as the —Q— group —Sn—, stannous oxalate, dibutyl tin oxide, zinc chloride, zinc alcoholates, silicon tetrachloride, dichlorosilanes, such as ortho-diphenyl-dichlorosilane, ortho-silicate esters of the type $Si(OR)_4$, aluminum chloride, aluminum alkoxides of the type $Al(OR)_2Cl$, $Al(OR)Cl_2$, $Al(OR)_3$, $BCl_3$, $BF_3$, boron esters of the type $B(OR)_3$, etc. Aluminum, silicon and boron alkyls such as triethyl aluminum, triisobutyl aluminum, tridecyl aluminum, ethylaluminum dichloride, diethyl aluminum chloride, trialkyl boron compounds and alkyl boron halides, e.g. Et—B—$Cl_2$, $Et_2BCl$, etc., are suitable cross-linking agents. Most of the reactive derivatives of the transition metals and phosphorus, such as their halide derivatives or their organic ester and metal alkyl, or combination halide-ester, halide-alkyl derivatives are beneficial cross-linking agents and catalysts, so long as they are capable of exhibiting a functionality of two in reaction with a hydroxyl group, or are capable of otherwise inducing cross-linking via ester interchange reactions. Appropriate mixtures of the inorganic and organic cross-linking agents may be used, for example, to obtain the desired degree of cross-linking and at the same time to obtain the optimum catalytic effect for isoolefin liberation. When a catalyst, distinct from the cross-linking agent, is employed to cause liberation of the tertiary olefin gas and foaming of the composition, this catalyst, for decomposition of the tertiaryalkoxy side chain, may be any acidic material, that is, any material which, according to the Lewis theory, contributes a proton to the reaction mixture. Such acid-acting, solid, dispersible-solid, or liquid materials as sodium bisulfate, phosphotungstic acid, sulfuric acid, quaternary ammonium salts, carbonylic or even carboxylic acids, sulfonic acids, phosphoric acids, cationic exchange resins in the hydrogen form, etc., may be employed. Tertiary amines, e.g., an N-alkyl morpholine such as N-methyl, N-ethyl, or N-lauryl morpholine or a quaternary ammonium salt thereof, such as that of acetic anhydride and N-methyl morpholine, will catalyze the reaction. Other tertiary amines such as dimethyl ethanolamine, trimethylamine or triethylamine may also be used for this purpose.

Many polymers and copolymers containing tertiary-alkoxyalkyl groupings or hydroxyalkyl groups are capable of undergoing cross-linking without an extraneous cross-linking agent by heating the polymers per se at elevated temperatures in the presence of a suitable catalyst system for olefin liberation and/or transesterification. Presumably the cross-linking reaction occurs after liberation of the isoolefin, and involves the splitting out of $$HO-(R_1O)-H$$

for example, ethylene glycol, between polymer chains, as illustrated below:

*Cross-Linking by Transesterification*

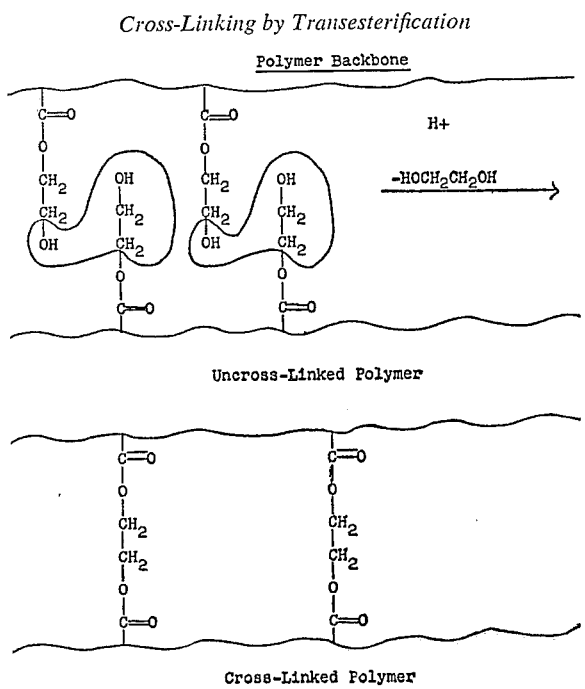

When foaming is to be obtained in the use of the novel polymers of this invention, certain conditions of viscosity are generally observed, as detailed below and in copending application Ser. No. 310,492. The tertiaryalkoxyalkyl polymer of this invention may be converted to the hydroxyalkyl without conversion to a permanent foam by violating these certain conditions. This conversion to hydroalkyl can be performed by heating the tertiaryalkoxyalkyl ester polymer under mild conditions while avoiding side reaction and releasing tertiary olefin. Preferably the temperature is about 70 to 150° C. and atmospheric or near atmospheric pressure is used. The polymer product desired, however, may require temperatures as low as about 50° C. to be used and these lower temperatures may require pressure reduction in order to get complete vaporization of the tertiary olefin by-product. Likewise, temperatures as high as about 200° C. or even as high as 300° C. or more may be employed where the starting and product polymer are not unduly deleteriously harmed by such conditions. The low viscosity desirable in order to avoid foaming may often be achieved by dissolving the polymer in a suitable solvent such as methyl ethyl ketone before heating and the progress of the reaction may be followed by collecting the isoolefin liberated by cleavage of the tertiaryalkoxyalkyl grouping of the polymer system, or by analyzing the polymer for hydroxyl groups using infrared or other known analytical techniques. Nitrogen or other purging gas may be employed or the reaction may be conducted under reduced pressure.

Often, strong acid catalysts such as sodium bisulfate, sulfonic acids or phosphotungstic acid, as well as phosphoric or sulfuric acids are used for olefin liberation, as may the hydrogen form of most cationic exchange resins. Even when cross-linking of the polymer is to be accomplished by ether formation through splitting out of water between two hydroxyalkyl side chains as shown below, it is often desirable to use a catalyst. This method of cross-linking, however, occurs to a much smaller degree than cross-linking by transesterification:

Cross-linking by ether formation can be represented by the following:

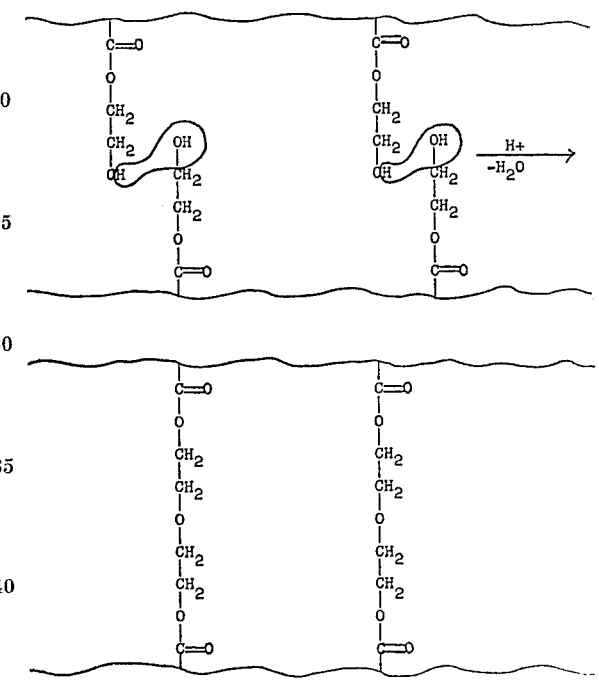

To summarize, therefore, the further use of the resin of this invention may employ cross-linking agents and catalysts for the reactions of olefin liberation and/or cross-linking. When the resin of this invention is in a form such as beads, it is usually desirable to include the catalyst or catalysts and/or the cross-linking agent in the bead itself. Generally, a suitable catalyst, when used, will be present in the bead in the amount of, say, about 0.01 to 2%. If a cross-linking agent is used it will be present in the amount of about 0.1 to 50%, preferably about 0.1 to 10%; the exact amount can depend on the molecular weight of the cross-linking agent and the amount of cross-linking desired. The agents for catalyzing decomposition and/or cross-linking may be mixed with the polymerization reaction mixture before or during the polymerization reaction if these agents will not interfere with the polymerization. Also, the agent or agents may be added to the polymerization reaction product before removal of the polymerizate from the reaction product mixture, if these agents are not sensitive to other materials present in the reaction mixture.

Sometimes it is preferable to introduce catalytic or cross-linking agents into the polymer after separation of the polymer from the reaction mixture but before sale or transfer of the polymer to the next point of processing. The agents may thus be introduced into the polymer by physically mixing below the decomposition temperature of the tertiaryalkoxyalkyl group of the feedstock polymer or copolymer. The catalysts and cross-linking agents may be dissolved in a hydrocarbon solvent and the polymer soaked therein to absorb solvent, catalysts and cross-linking agent. If the catalysts and cross-linking agents are insoluble in hydrocarbon solvents, and are easily hydrolyzed by an aqueous solvent, they may be dissolved in oxygenated solvents. Suitable solvents for this purpose are aromatic hydrocarbons, ketones, ethers, esters, amides, sulfoxides, nitriles, etc. Examples of solvents suitable for this purpose are acetone, methyl ethyl ketone, cyclohexanone, acetophenone, methyl isobutyl ketone, ethyl ether, ethylene glycol dimethyl ether, tetrahydrofuran, N,N-dimethyl formamide, N,N-diethyl formamide, dimethyl sulfoxide, acetonitrile and the like. Physical mixing of the polymer with the catalyst and cross-linking agent may also take place in the absence of solvent. This may be especially desirable when the catalyst and cross-linking agents are compatible liquids. When in solid form, the catalyst and cross-linking agent may be admixed with the polymer in a finely powdered form.

It sometimes may be desirable to incorporate extraneous blowing agents into the polymer before foaming. Such conventionally employed materials as $NaHCO_3$ which releases $CO_2$ under blowing conditions, $NaHSO_3$ which decomposes to $SO_2$, etc., may be incorporated in the polymer beads or other form of polymer in generally the same manner as the catalysts and cross-linking agents previously described.

Liberation of the olefin from the tertiary alkoxyalkyl ether linkage may be performed simultaneously with or prior to the foaming and may be brought about by thermal decomposition alone, or by the action of a catalyst, usually at a temperature at least somewhat elevated above ambient temperature.

Olefin liberation may be brought about by heating the material, usually in the presence of one of the acid catalysts described above. As mentioned, the decomposition reaction is usually carried out at a temperature of at least about 90° C. and may range up to the decomposition temperature of the polymer, say about 350° C. Preferably, the decomposition takes place at a temperature of about 70 to 150° or 300° C. This heating may take place under pressure, and/or at a temperature below the softening temperature of the polymer beads or other form, to decompose the ether linkage without foaming while trapping the liberated tertiary olefin gas within the polymer matrix. In such circumstances any liberated isobutylene or other olefin gas appears to be dissolved, or at least thoroughly and finely dispersed in the polymer which may then be cooled, transported, etc., as an unfoamed material.

Sometimes a non-foamed product having free hydroxyalkyl groups may be desired. Such a product is, of course, susceptible to cross-linking by the mechanisms outlined. In such cases the olefin is liberated from the polymer under conditions, such as reduced pressure, suitable for removing the olefin gas, preferably as it is formed.

Foaming itself may be brought about by heating the polymer material containing liberated tertiary olefin to its softening temperature under, say, atmospheric pressure, or even by melting the polymer under elevated pressure sufficient to prevent escape of the gas from the foam. More often, foaming conditions are established during olefin liberation so that gas production, foaming and frequently even some cross-linking, take place simultaneously. Insofar as the physical state of the foamable composition is concerned, the polymer is often foamed from a melt or may be in the form of a plastisol or organosol. The preferred viscosity for foaming varies, depending upon the polymers used, but generally is in the range of about 50 centipoises to 20,000 poises at the temperature of olefin liberation.

The following examples of this invention are to be considered illustrative only and not limiting.

2-tertiarybutoxyethanol is prepared as follows. Into a 1-liter autoclave are charged 134 g. of isobutylene and 400 grams of commerical grade ethylene glycol. Fifty grams of Dowex 50X–12 sulfonated polystyrene-divinylbenzene type solid resin catalyst containing 12% divinylbenzene is added to the autoclave. The catalyst has a mesh size of about 50–100 and contains from about 42–48% moisture. The autoclave is sealed and the reaction mixture heated at 93° C., under autogenous pressure, for a period of about seven hours. The product is removed after cooling and depressurizing the autoclave. The product is worked up by first distilling off the unreacted isobutylene. The distillant (residue) is further distilled at atmospheric pressure or in vacuo to obtain as overhead the tertiarybutoxyethanol.

Into a 100 ml. flask fitted with an 18″ distillation column were placed 20 grams of stabilized methyl methacrylate, 59 grams of tertiary butoxyethanol and 0.05 gram of tetraisopropyl titanate catalyst. The mixture was heated at 130 to 145° C. for about four hours during which time 5 grams of methanol was collected overhead. The mixture was then distilled in vacuo to afford unreacted tertiarybutoxyethanol and tertiarybutoxyethyl methacrylate B.P. 42 to 44° C./0.07 to 0.008 mm., $n_D^{20}$ 1.4306, $D^{20}/4$ 1.0491.

EXAMPLE I

*Bulk polymerization of 2-tertiarybutoxyethyl methacrylate*

2.21 grams of t-butoxyethyl methacrylate were placed in a small polymerization tube. The tube was flushed with nitrogen and 0.02 gram of benzoyl peroxide added to the tube. The tube was again flushed with nitrogen and sealed. The tube was placed in an oven at 70° C. for a period of 24 hours. Polymerization of the monomer took place to give a glassy thermoplastic polymer, which could be molded into sheets or cast into films. Infrared examination of the polymer showed characteristic absorption for the tertiarybutoxy grouping and ester grouping.

EXAMPLE II

*Solution polymerization of 2-tertiarybutoxyethyl methacrylate*

Into a 4-necked flask equipped with nitrogen inlet tube, condenser, stirrer and thermometer were placed 18.22 grams of 2-tertiarybutoxyethyl methacrylate, 13 grams of methyl ethyl ketone and 0.09 gram of benzoyl peroxide. The mixture was heated under reflux for a period of three hours, after which time the contents became very viscous, indicating that polymerization of the monomer had taken place. Evaporation of the solvent gave a thermoplastic polymer which was similar to the polymer prepared in bulk.

EXAMPLE III

*Formation of poly(2-hydroxyethyl)methacrylate from poly(2-tertiarybutoxyethyl)methacrylate*

To a solution of about 40 ml. of methyl ethyl ketone containing 13 grams of poly(2-tertiarybutoxyethyl)methacrylate, prepared according to Example II, was added 0.2 gram of phosphotungstic acid. The mixture was charged to a 4-necked flask containing a heater, stirrer, thermometer and condenser connected to a series of small Dry Ice traps. The mixture was heated under reflux and isobutylene immediately began to collect in the Dry Ice trap. After about one hour 4.3 grams of isobutylene was collected and a portion of the polymer precipitated from solution. The solvent was removed from the polymer and the polymer was dried in vacuo. Infrared analysis of the polymer showed no evidence of the tertiarybutoxyethyl group and showed absorption characteristics of hydroxyl group and ester group. The infrared spectrum of this polymer was identical with a polymer prepared by polymerizing 2-hydroxyethyl methacrylate independently.

Similar experiments were conducted in which only a portion of the isobutylene was liberated from poly(2-tertiarybutoxyethyl)methacrylate. This permitted the formation of polymers containing both tertiarybutoxyethyl and hydroxyethyl groupings.

EXAMPLE IV

*Emulsion copolymerization of 2-tertiarybutoxyethyl methacrylate with methyl methacrylate*

Many copolymers were prepared from tertiarybutoxyalkyl methacrylates and methyl methacrylate. In a typical and 3.7 grams (0.02 mole) of tertiarybutoxyethyl methacand 3.7 grams (0.02 moles) of tertiarybutoxyethyl methacrylate were charged to a flask containing 50 grams of deionized water, 2.4 grams of sodium lauryl sulfate and 0.05 gram of ammonium persulfate. The reaction flask was heated in a water bath and the premixed monomers were added rapidly until about one-half of the monomer charge was added. Nitrogen was bubbled into the reaction flask throughout the reaction period to eliminate oxygen from the mixture. During the initial monomer addition, the temperature rose from 71° C. to 90° C. The remainder of the monomer mixture was then added over a period of about one-half hour. After polymerization was complete the emulsion was treated with saturated aluminum ammonium sulfonate, which caused precipitation of the polymer from the emulsion. The resulting white polymer was washed several times in a Waring Blendor with water and finally dried in vacuo at 70° C. for 12 hours. The dried, white, powdery polymer weighed 23.3 grams.

The tertiarybutoxyethyl groups of the copolymer are readily converted to hydroxyethyl groups by heating the polymer per se, or in solution with phosphotungstic acid, sodium bisulfate, p-toluene sulfonic acids or the like.

EXAMPLE V

*Emulsion copolymerization of 1-tertiarybutoxy-2-propyl methacrylate with methyl methacrylate*

1-tertiarybutoxy-2-propyl methacrylate was prepared by placing into a 300 ml. flask fitted with a thermometer, nitrogen inlet tube and distillation head, 33 gms. of methyl methacrylate, 0.3 gm. of dibutyl tin oxide, 0.4 gm. of hydroquinone and 132 gms. of 1-tertiarybutoxy-2-propanol. The latter compound was prepared from the reaction of isobutylene and propylene glycol using a Dowex 50 catalyst. The reactants were heated under a nitrogen atmosphere for 14 hours at 140 to 150° C. during which time 12.1 grams of methanol was collected overhead. The cooled reaction mixture was filtered to remove the undissolved catalyst and distilled in vacuo. Distillation gave, initially, some unreacted methyl methacrylate, unreacted 1 - t - butoxy - 2 - propanol and pure 1 - t-butoxy - 2 - propyl methacrylate, B.P. 41° C./0.15 mm., $n_D^{20}$ 1.4275, Sp. Gr. 20/4 0.9169.

A copolymer was prepared from 20 grams of metyhl methacrylate (0.2 mole) and 1 - tertiarybutoxy - 2 - propyl methacrylate using the emulsion technique described in Example IV. The copolymer product weighed 22.6 grams and was shown to contain tertiarybutoxypropyl groups by infrared analysis. The copolymer was useful for preparing laminates, films and coatings, moldings, etc. When the copolymer was heated in the presence of acidic catalysts it was possible to liberate isobutylene from the copolymer, thereby converting the tertiarybutoxypropyl groups into hydroxypropyl groups.

EXAMPLE VI

*Emulsion copolymerization of styrene and 1-tertiarybutoxy-2-propyl methacrylate*

The following ingredients were employed for emulsion copolymerization of styrene and 1 - tertiarybutoxy-2 - propyl methacrylate:

| | Gms. |
|---|---|
| Styrene (redistilled) | 13.3 |
| 1-t-butoxy-2-propyl methacrylate | 5.0 |
| Potassium persulfate (catalyst) | .05 |
| Sodium hydrogen phosphate (buffer) | .05 |
| Sodium lauryl sulfate (emulsifier) | 1.0 |
| Distilled water | 100 |

The catalyst, emulsifier and buffer were added to a 4-necked reaction flask while purging the flask with nitrogen. The monomers were pre-mixed and added to the stirred flask to effect emulsification of the system. The well-stirred charge was heated, under nitrogen, at 70° C. for 2 hours and at 90° C. for an additional 2 hours. After polymerization was complete, alum was added to precipitate the polymer. The filtered, washed, and dried polymer weighed 18 grams. Infrared analysis showed the presence of t-butoxypropyl groups and styrene groups in the polymer, indicating that copolymerization had taken place.

EXAMPLE VII

*Solution copolymerization of styrene and methyl-2-tertiarybutoxyethyl fumarate*

Methyl 2-t-butoxyethyl fumarate is formed by placing into a 2-liter flask fitted with a nitrogen inlet tube, stirrer, condenser and receiver, 493 grams of tertiarybutoxyethanol and 200 grams of dimethyl fumarate. To this mixture is then added 2 grams of tetraisopropyl titanate. The mixture is heated to a temperature of 140 to 180° C. for several hours, until about 2 moles of methanol is collected as overhead. Distillation of the mixture is then carried out in vacuo and provides pure methyl t-butoxyethyl fumarate, B.P. 96° C./0.08 mm., $n_D^{25}$ 1.4460.

Into a 100 ml., 4-necked flask equipped with a stirrer, thermometer, condenser, heating bath and nitrogen inlet tube was placed the following:

| | Gms. |
|---|---|
| Styrene (redistilled) | 15 |
| Methyl 2-t-butoxyethyl fumarate | 6.62 |
| Methyl ethyl ketone | 15 |
| Benzoyl peroxide | 0.12 |

The ingredients were heated under reflux, with stirring, for a period of about 16 hours. During this time the solution became very viscous, indicating that polymerization had taken place. The polymer was precipitated from the methyl ethyl ketone solution by the addition of methanol. The precipitated polymer was a white, powdery solid and was dried in vacuo at 60° C. for 8 hours. The dried polymer weighed 16.7 grams. Infrared analysis of the polymer showed the presence of the ester grouping, the t-butoxyethyl grouping and the aromatic nucleus, indicating that copolymerization had taken place. The polymer was molded into plastic sheets in a press at 160° C.

EXAMPLE VIII

*Preparation of copolymer of styrene and methyl 2-hydroxyethyl fumarate from copolymer of styrene and methyl 2-t-butoxyethyl fumarate*

Into a 4-necked flask fitted with a thermometer, nitrogen inlet tube, stirrer, reflux condenser (attached to Dry Ice traps) and heating mantel was placed 5.0 grams of the copolymer of styrene and methyl 2-t-butoxyethyl fumarate as prepared in Example VII. Thirty-six grams of methyl ethyl ketone and .05 gram of phosphotungstic acid were then added to the flask. As soon as the mixture reached the reflux temperature of methyl ethyl ketone, isobutylene commenced to collect in the Dry Ice Traps. After a period of about 25 minutes approximately 0.21 gram of isobutylene was collected. The polymer was precipitated from the methyl ethyl ketone solution with isopentane and dried in vacuo. Four grams of a thermoplastic polymer was obtained. Infrared analysis of the polymer showed the presence of hydroxyl groups, carbonyl groups (ester) and aromatic bands, indicating that conversion of the t-butoxyethyl groups to hydroxyethyl groups had taken place.

EXAMPLE IX

*Solution copolymerization of vinylidene chloride with bis(2-tertiarybutoxyethyl)maleate*

Into a 2-liter, 4-necked flask equipped with a stirrer, thermometer, Dean Stark trap and condenser was placed 1 mole of maleic anhydride (98.06 grams) and 2.2 moles of 2-tertiarybutoxyethanol, together with 500 ml. of toluene. The mixture was heated under reflux for several days and the water of reaction removed continuously during the course of the reaction. After the theoretical amount of water was formed, the solvent was removed and the bis(2-tertiarybutoxyethyl)maleate was purified by distillation under reduced pressure, and showed a boiling point of 156° C. at 0.3 mm., $n_D^{20}$ 1.4490, $D^{20}_4$ 1.0237.

Into a 100 ml. flask fitted with heater, stirrer, thermometer and condenser were placed 20 grams of vinylidene chloride and 12.8 grams of bis(2-tertiarybutoxyethyl) maleate. To this mixture was then added 22 grams of methyl ethyl ketone and 0.16 gram of benzoyl peroxide. The mixture was heated under reflux for 6 hours under a nitrogen atmosphere with continuous stirring. After cooling the reaction mixture to room temperature it was poured into methanol, which caused immediate precipitation of polymer. The polymer was filtered and dried in vacuo. The dried polymer weighed 13.7 grams and was a white thermoplastic solid which formed hard films and sheets. Infrared analysis of the polymer showed the presence of the carbonyl ester function, the C—Cl grouping and t-butoxy groupings, indicating the copolymerization had taken place. Rapid liberation of isobutylene occurred when the polymer was heated in the presence of sodium bisulfate in solution or in bulk, which resulted in the conversion of the t-butoxyethyl groups of the polymer to hydroxyethyl groups.

EXAMPLE X

*Solution copolymerization of styrene with 2-tertiarybutoxyethyl crotonate*

Into a 1-liter flask fitted with a stirrer, condenser, receiver, thermometer and heating mantel were placed 150 grams of methyl crotonate and 466 grams of tertiarybutoxyethanol. To this mixture was then added 0.5 gram of dibutyl tin oxide ester interchange catalyst. The mixture was heated to 110° C. whereupon methanol commenced to distill from the reaction mixture. After slightly more than one mole of methanol was collected the mixture was cooled and distilled in vacuo. A mixture of the cis and trans t-butoxyethyl crotonate esters was obtained, B.P. 65 to 76° C./1.25 mm.; a center cut from the distillation was analyzed: Calcd.: C, 64.89%; H, 9.74%. Found: C, 64.66%; H, 9.79%. $n_D^{25}$ 1.4355.

Forty grams of styrene, 14.3 grams of 2-tertiarybutoxyethyl crotonate, 0.27 gram of benzoyl peroxide and 36 grams of methyl ethyl ketone were charged to the resin flask and polymerized as described in the preceding example. After precipitation in methanol, followed by washing and drying, 31.5 grams of dried thermoplastic white polymer was obtained, which showed the presence of carbonyl groups, tertiarybutoxy groups and aromatic groups by infrared analysis.

A small amount of the polymer was heated in methyl ethyl ketone solution under reflux in the presence of phosphotungstic acid, which caused liberation of isobutylene and the formation of hydroxyethyl end groups in the copolymer.

EXAMPLE XI

*Bulk copolymerization of bis(2-t-butoxyethyl)maleate with styrene*

Into a 15 ml. polymerization tube was placed 2.6 grams of bis(2-t-butoxyethyl)maleate (see Example IX) and 1.0 grams of redistilled styrene. The tube was flushed with nitrogen for several minutes to remove any dissolved oxygen. Benzoyl peroxide (0.007 gram) was then added to the tube and the tube was sealed. The tube was heated at 70° C. for 24 hours, after which time a very viscous polymer was obtained. The polymer was dissolved in petroleum ether and methanol was added to the petroleum ether solution. Immediate precipitation of a solid polymeric material occurred. Infrared examination of the polymer showed characteristic absorption for the ester grouping, the tertiary butoxy grouping and aromatic grouping, indicating that copolymerization had occurred. By varying the ratio of styrene to bis(2-t-butoxyethyl)maleate varieties of polymer differing in solubility characteristics and softening points were produced. These polymers were useful as coatings and laminating resins. Prolonged heating of the polymers caused cross-linking to occur as evidenced by their insolubility in organic solvents after heating.

EXAMPLE XII

*Bulk copolymerization of bis(2-t-butoxyethyl)itaconate with styrene*

Into a 100 ml. flask equipped with a nitrogen inlet tube, thermometer, receiver, and condenser was placed 22 grams of dimethyl itaconate and 49.3 grams of tertiarybutoxyethanol. To this mixture was then added 0.1 gram of tetraisopropyl titanate catalyst. The mixture was heated at 140 to 155° C. for about 7 hours in a nitrogen atmosphere, after which time about 9 grams of methanol was distilled overhead. After removing the unreacted t-butoxyethanol by distillation, further distillation gave bis(2-tertiarybutoxyethyl)itaconate, B.P. 130° C. at 0.1 mm., $n_D^{20}$ 1.4468, $D^{20}_4$ 1.0149.

Four grams of bis(2-tertiarybutoxyethyl)itaconate and 1.2 grams of redistilled styrene were placed in a 15 ml. polymerization tube together with 0.1 gram of benzoyl peroxide. The tube was sealed after purging with nitrogen and heated at 70° C. for 43 hours. A hard glassy polymeric material was formed, which was reprecipitated by dissolving in petroleum ether, followed by the addition of methanol. The polymer formed flexible films and coatings.

Copolymers of styrene and bis(2-t-butoxyethyl)itaconate of varying compositions were prepared by changing the ratio of monomers. These polymers ranged from low melting to high melting solids and were soluble in most hydrocarbon solvents.

EXAMPLE XIII

*Copolymerization of vinyl acetate and bis(2-t-butoxyethyl)maleate*

Eight grams of vinyl acetate, 2.0 grams of bis(2-t-butoxyethyl)maleate (see Example IX) and 0.05 gram of benzoyl peroxide were placed in a 15 ml. polymerization tube which was purged with nitrogen prior to sealing. The tube was heated at 70° C. for 24 hours. A hard glassy polymer formed which was reprecipitated from benzene by the addition of methanol. Infrared analysis confirmed the presence of the ester group and t-butoxyethyl group indicating that copolymerization had taken place. The copolymer formed flexible sheets when molded and could also be cast into hard flexible films from solution. The copolymer showed more flexibility than a homopolymer of vinyl acetate prepared in a similar fashion.

EXAMPLE XIV

*Emulsion polymerization of vinyl chloride with bis(2-tertiary-butoxyethyl)itaconate*

Into a 300 ml. stirred autoclave were placed 100 grams of water, 1.0 gram of sodium lauryl sulfate, 0.75 gm. of ammonium persulfate, 0.30 gm. of sodium bisulfite and 1.6 gm. of bis(2-t-butoxyethyl)itaconate. (See Example XII.) The autoclave was sealed and flushed with nitrogen thoroughly to eliminate oxygen from the mixture. Vinyl chloride (32 gm.) was then charged to the autoclave, which was stirred and heated at 70° C. for 4 hours. The autoclave was cooled and the emulsion treated with sodium chloride solution which caused precipitation of polymer. The polymer was washed thoroughly with water in a Waring Blendor and dried in vacuo. The dried polymer weighed 22 grams. Infrared analysis showed the presence of the C–Cl grouping and tertiarybutoxyethyl groupings in the polymer, indicating that copolymerization took place. Tough, fairly flexible films of the copolymer were cast from tetrahydrofuran solution. The copolymer was made into a plastisol with dioctyl phthalate and when heated formed a tough, flexible, plasticized polymer. Numerous other copolymers of vinyl chloride and bis(2-t-butoxyethyl)itaconate were prepared in which the ratio of itaconate ester to vinyl chloride was increased so that the final copolymer contained up to 20 mole percent bis(2-t-butoxyethyl)itaconate. The copolymers containing the higher amounts of itaconate ester formed more flexible films and plasticized polymers. These copolymers could also be heated in solution or in bulk, with an acidic catalyst, to convert the tertiarybutoxyethyl groupings to hydroxyethyl groupings.

EXAMPLE XV

*Emulsion polymerization of vinyl chloride with bis(2-tertiarybutoxyethyl)maleate*

Using the above emulsion technique, the following recipe was employed for copolymerizing vinyl chloride with bis(2-tertiarybutoxyethyl)maleate:

| | Grams |
|---|---|
| Water | 100 |
| Sodium lauryl sulfate | 2 |
| Ammonium persulfate | 0.75 |
| Sodium bisulfite (meta) | 0.3 |
| Vinyl chloride | 15.5 |
| Bis(2-t-butoxyethyl)maleate | 3.3 |

The reaction was carried out for four hours at 70° C. to give 12.5 grams of copolymer. In another experiment 16 grams of vinyl chloride and 0.80 gram of maleate ester were polymerized. Infrared analysis of these polymers showed that both the C–Cl grouping and tertiarybutoxyethyl grouping were present, indicating that copolymerization had taken place. These polymers were purified by dissolving in tetrahydrofuran and reprecipitating with methanol. Films of the polymers were cast from tetrahydrofuran solution and were found to be tough, flexible and transparent. Plastisols of good quality could also be prepared by mixing the polymers with dioctylphthalate. These plastisols formed transparent sheets when calendered.

EXAMPLE XVI

*Emulsion polymerization of vinyl chloride with bis(2-tertiarybutoxyethyl)fumarate*

Into a 100 ml. flask equipped with a nitrogen inlet tube, thermometer, condenser, and receiver is placed 15 grams of dimethyl fumarate and 36.7 grams of 2-tertiarybutoxyethanol. To this mixture is added 0.1 gram of tetraisopropyl titanate and the mixture is heated for about 13 hours from 135 to 180° C. while continuously bubbling nitrogen through the mixture. After about 6 grams of methanol is collected the mixture is distilled to remove the excess tertiarybutoxyethanol. Further distillation gives bis(2-tertiarybutoxyethyl)fumarate, B.P. 132° C. at 0.1 mm., which solidifies to a crystalline solid, M.P. 35 to 36°.

Vinyl chloride copolymers containing varying amounts of bis(2-tertiarybutoxyethyl)fumarate were prepared using the previously described emulsion technique for copolymerizing the bis(2-tertiarybutoxyethyl)itaconate and maleate with vinyl chloride. In a typical experiment, the following ingredients were polymerized in the 300 ml. autoclave for about 4 hours at 160° F.:

| | Grams |
|---|---|
| Water | 100 |
| Sodium lauryl sulfate | 5.0 |
| Ammonium persulfate | 0.75 |
| Sodium bisulfite (meta) | 0.30 |
| Vinyl chloride | 15 |
| Bis(2-tertiarybutoxyethyl)fumarate | 3.0 |

The polymer was washed and dried in the usual fashion and weighed 11 grams. Infrared analysis of the polymer showed the presence of the C—Cl grouping, ester grouping and t-butoxyethyl grouping, indicating that copolymerization had taken place.

EXAMPLE XVII

*Emulsion polymerization of butadiene with bis(2-tertiarybutoxyethyl)maleate*

A rubber-like copolymer of butadiene and bis(2-tertiarybutoxyethyl)maleate was prepared using the following reactants and emulsion system:

| | Grams |
|---|---|
| Butadiene | 36 |
| Sodium stearate | 5 |
| Distilled water | 180 |
| Potassium persulfate | 0.3 |
| Dodecyl mercaptan | 0.5 |
| Bis(2-tertiarybutoxyethyl)maleate | 5 |

All the ingredients, except the butadiene, were charged to the autoclave, which was deoxygenated with nitrogen prior to sealing. Butadiene was then charged to the autoclave and the mixture heated for 20 hours with rapid stirring. After cooling, the emulsion was removed from the autoclave and treated with saturated ammonium aluminum sulfate, which caused precipitation of the polymer. The polymer was washed in ethanol containing phenyl beta naphthylamine and dried in vacuo. The dried polymer weighed 37.5 grams and was a rubber-like, crumbly, material.

EXAMPLE XVIII

*Emulsion copolymerization of 3,3-dimethyl-1-butene with bis(2-tertiarybutoxyethyl)fumarate*

Into a 300 ml. stirred autoclave were charged 180 ml. distilled water, 5 grams of sodium stearate, 1.0 gm. of potassium persulfate and 3.0 grams of bis(2-t-butoxyethyl)fumarate. The autoclave was sealed and purged with nitrogen. Ten grams of 3,3-dimethyl-1-butene was then introduced into the autoclave from a pressure vessel and the autoclave heated, with stirring, for a period of about 40 hours at 175 to 180° F. After cooling, the emulsion was removed from the autoclave and treated with alum, which caused precipitation of solid polymer. The solid polymer was dried on a Buchner funnel and heated in methanol. A portion of the polymer (1.6 grams) was found to be methanol insoluble and the remaining polymer (5 gms.) was soluble in methanol. The soluble portion was isolated from the methanol solution by adding water which caused immediate precipitation of solid polymer.

EXAMPLE XIX

*Bulk copolymerization of bis(2-tertiarybutoxyethyl) itaconate and acrylonitrile*

Into a 15 ml. polymerization tube were placed 3.3 grams of bis(2-t-butoxyethyl)itaconate and 0.53 gram of acrylonitrile. The tube was deoxygenated with nitrogen and 0.008 gram of benzoyl peroxide catalyst added. The tube was then sealed and heated at 70 to 80° C. for several days. A very viscous liquid polymer was obtained, which was dissolved in petroleum ether and precipitated from solution to give a low melting solid polymer. Infrared analysis of the polymer showed the presence of nitrile groups and tertiarybutoxyethyl groups, indicating that copolymerization had taken place.

EXAMPLE XX

*Suspension copolymerization of 2-tertiarybutoxyethyl methacrylate and styrene*

To a reaction vessel was charged 2500 parts of distilled water, 0.5 part of sodium lauryl sulfate, 7.5 parts of gelatin, 25 parts sodium sulfate and 7.5 parts stearic acid. The mixture was heated at 70 to 80° C. and the following monomer charge added over a period of about 1 hour: 200 grams 2-tertiarybutoxyethyl methacrylate, 550 grams inhibitor-free styrene and 5.0 grams benzoyl peroxide. The mixture was heated at 70 to 80° C. for a period of about 4 hours to give a quantitative yield of white copolymer beads. The beads were filtered and washed with dilute hydrochloric acid, followed by several water washes, and dried in a forced-air oven at 60° C. for several hours.

A portion of these beads was treated with a solution of methyl aluminum dichloride and pentane which caused impregnation of the beads with some diethyl aluminum chloride and pentane. Another portion was swollen for a period of about one hour with a solution of about 5% pyromellitic anhydride in acetone and that solution was mixed with about an equal amount of benzene and partially dried. Still another portion of the beads was saturated in about 30 minutes with a solution of about 5% 2,4-tolylene diisocyanate in pentane containing about 5% of tetrahydrofuran and a few percent of BF$_3$. This swollen portion containing about 5% of the pentane solution was partially dried in a forced-draft oven at 50° C. Each of these bead compositions, as well as a mixture of the beads with liquid TiCl$_4$, was foamed and cross-linked by heating in molds.

EXAMPLE XXI

*Suspension copolymerization of styrene and tertiary-butoxyethyl acrylate*

To a reaction flask were charged 2500 parts of distilled water, 50 parts tricalcium phosphate and 0.15 gram of sodium dodecyl benzene sulfonate. The mixture was heated to 80° C., and the following monomer charge was added over a period of about ½ hour: 800 parts inhibitor-free styrene, 200 parts tertiarybutoxyethyl acrylate and 7 grams benzoyl peroxide. The mixture was stirred for 7 hours at 70 to 80° C. during which time a quantitative conversion of monomers to copolymer beads occurred. The beads were washed with dilute hydrochloric acid and water and dried in a forced-draft oven at 60° C.

Samples of these beads were impregnated with PCl$_3$ from a solution of about 2 to 3% of the chloride in a 30% benzene-70% pentene mixture. Also, another sample of the above beads was impregnated for about 30 minutes with a 5% solution of a styrene-maleic anhydride copolymer prepared by dissolving a low molecular weight resin (about 750 M) in a mixture of 95% pentane and 5% methylethyl ketone. The impregnated resin was dried in a forced-draft oven at 50° C.

Each of these bead compositions could be foamed by heating in a mold to give a foamed polymer showing better dimensional stability and solvent resistance than conventional uncross-linked polystyrene foam.

EXAMPLE XXII

*Suspension copolymerization of styrene and bis(2-tertiarybutoxyethyl)maleate*

To a reaction flask was charged 2500 parts of distilled water, 0.5 part of sodium lauryl sulfate, 10 parts gelatin, 25 parts sodium sulfate and 7.5 parts stearic acid. To this mixture was added the following over a period of ½ hour: 500 parts styrene (inhibitor-free), 160 parts bis(2-tertiarybutoxyethyl)maleate and 5.5 grams benzoyl peroxide. The mixture was stirred rapidly for a period of 18 hours at 65 to 70° C. to give a quantitative yield of white polymer beads which were washed with water and dried in a vacuum oven at 50° C.

A portion of the above beads was impregnated with 2 to 3% diphenyl dichloro silane in a 50% benzene-50% pentane solution; then the impregnated beads were dried to remove the solvent. Another portion of the above beads were impregnated in a similar fashion with tetraisopropyl titanate. In another experiment a portion of the beads was immersed for about 30 minutes in a syrupy acid-catalyzed phenol formaldehyde polymer containing about 2% of the sulfuric acid used initially as the catalyst for condensation polymerization, while in still another experiment, a portion of the above beads was immersed for about 30 minutes in a commercial solution sold as Epon 820, of 10% epoxy resin in mineral spirits and containing a small amount of BF$_3$-etherate catalyst. Each of these bead compositions was heated without further addition of reagents in molds to produce foamed polymer compositions.

EXAMPLE XXIII

*Esterification of styrene-maleic anhydride copolymer*

A styrene-maleic anhydride copolymer was prepared by polymerizing styrene and maleic anhydride in cumene solution at 200° C. using about 4% dicumyl peroxide as the catalyst. The resulting polymer had a molecular weight approximately equal to the following:

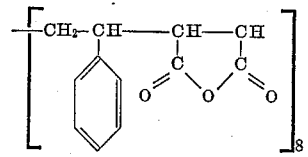

Into a 500 ml. resin kettle was placed 135.7 grams of this copolymer and 230 grams of tertiarybutoxy ethanol. The mixture was heated at 100-110° C. for 1½ hours until viscous and then heated under a vacuum of 1–2 mm. to remove unreacted t-butoxy ethanol. An extremely viscous syrup resulted which was shown by infrared analysis to contain both esterified and unesterified carboxyl groups. The resin was placed in a mold and heated at 140 to 150° C. to liberate isobutylene and give an extremely hard, tough, foamed, cross-linked resin.

EXAMPLE XXIV

*Suspension copolymerization of bis(2-tertiarybutoxyethyl)maleate and vinyl acetate or chloride*

Into a reaction vessel was charged 1500 parts of water, 5 parts of sodium dodecyl sulfate and 4 grams of sodium phosphate. The vessel was heated to 50° C. and the following monomer mixture charged over a period of 30 minutes: 400 parts vinyl acetate, 200 parts bis(2-tertiarybutoxyethyl)maleate and 3.5 grams alpha,alpha'-azobisisobutyronitrile. The mixture was polymerized overnight to give spherical beads, which were washed and dried in the usual fashion.

A portion of the above beads was immersed for about 30 minutes in a 50–50 benzene-pentane solution containing about 10% of 2,4-tolylene diisocyanate and about 1%, based on cyanate, of a catalyst mixture of dibutyl tin oxide and stannous chloride, while another portion was immersed in a similar solution, but containing about 5% pyromellitic dianhydride and a small amount of titanium tetrachloride, to be used as cross-linking agent and catalyst, respectively.

A copolymer of vinyl chloride (100 parts) and bis(2-tertiarybutoxyethyl)maleate (50 parts) was prepared as above in the form of the copolymer beads.

A portion of the beads was expanded thermally, without catalyst, by heating at 120 to 200° C. for about 30 minutes. This material, containing free hydroxyalkyl side chains, showed some attack by organic solvents.

EXAMPLES XXV TO XXX

*Preparation of tertiarybutoxyethyl-containing polymers by gamma radiation from a cobalt 60 source*

In order to demonstrate that irradiation initiation can be employed for preparing copolymers containing the tertiarybutoxyethyl groups, many experiments were carried out in which homopolymers and copolymers were prepared.

The experiments were carried out by placing the monomer or monomers into a 15-ml. polymerization tube. The tube was then cooled in liquid nitrogen and degassed in vacuo by successively freezing and thawing the contents of the tube until no further gas evolution occurred. The tube was then sealed in vacuo and irradiated with a cobalt 60 source, at the dose rate indicated. The results of these experiments are tabulated below:

GAMMA RAY POLYMERIZATION OF TERTIARYALKOXYALKYL MONOMERS

| Examples | Identity of Monomer | Dose Rate | Results of Irradiation |
|---|---|---|---|
| XXV | 2.0 gm. Bis(2-t-butoxyethyl) fumarate. | $4.2 \times 10^6$ roentgens per hr. for 21 hours. | Solid thermoplastic polymer produced. |
| XXVI | 2.31 gm. 2-t-butoxyethyl crotonate. | ....do.................. | Liquid polymer produced. |
| XXVII | 2.41 gm. Bis(2-t-butoxyethyl) itaconate. | ....do.................. | Solid thermoplastic polymer produced. |
| XXVIII | 3.44 gm. Styrene and 1.25 gm. Bis(2-t-butoxyethyl) fumarate. | $22.2 \times 10^6$ roentgens per hr. for 111 hours. | White, opaque, solid thermoplastic polymer produced. |
| XXIX | 4.39 gm. Styrene and 1.83 gm. Bis(2-t-butoxyethyl) itaconate. | ....do.................. | Clear, solid thermoplastic polymer produced. |
| XXX | 3.28 gm. Styrene and 1.78 gm. Bis(2-t-butoxyethyl) crotonate. | ....do.................. | Do. |

This application is a continuation-in-part of my copending application Ser. No. 202,963, filed June 18, 1962, and now Patent No. 3,317,483.

It is claimed:

1. An addition polymer having an average molecular weight of at least about 500 formed by polymerization at the double bond of a monomer containing 1 to 100% of a diester of a monoolefinically unsaturated dicarboxylic acid selected from the group consisting of maleic acid, itaconic acid and fumaric acid and an alcohol in which one alcohol group is tertiary-alkoxyalkyl of the formula $-(R_1O)_x-R_2$, where $R_1$ is a divalent aliphatic hydrocarbon radical of 2 to 12 carbon atoms, $R_2$ is a tertiary alkyl radical of 4 to 10 carbon atoms, and $x$ is a number from 1 to 25, and the other alcohol group is selected from the group consisting of tertiaryalkoxyalkyl of the formula $-(R_1O)_x-R_2$ and lower alkyl, the essential balance of the polymer being a copolymerizable olefinic compound of 2 to 12 carbon atoms.

2. The polymer of claim 1 wherein the tertiaryalkoxyalkyl is 2-tertiary-butoxyethyl.

3. The polymer of claim 2 in which said copolymerizable olefinic compound has the formula $H_2C=CHX$ where X is selected from the group consisting of halogen, lower alkyl, cyano, acetoxy, phenyl, vinyl and carbomethoxy radicals.

4. An addition polymer having an average molecular weight of at least about 500 formed by polymehization at the double bond of a monomer containing 1 to 100% of a diester of a monoolefinically unsaturated dicarboxylic acid selected from the group consisting of maleic acid, itaconic acid and fumaric acid and a tertiaryalkoxyalkanol in which both alcohol groups are tertiaryalkoxyalkyl of the formula $-(R_1O)_x-R_2$, where $R_1$ is a divalent aliphatic hydrocarbon radical of 2 to 12 carbon atoms, $R_2$ is a tertiary alkyl radical of 4 to 10 carbon atoms, and $x$ is a number from 1 to 25, the essential balance of the polymer being a copolymerizable olefinic compound of 2 to 12 carbon atoms.

5. The polymer of claim 4 wherein the tertiaryalkoxyalkyl is 2-tertiary-butoxyethyl.

References Cited

UNITED STATES PATENTS

| | | |
|---|---|---|
| 1,706,639 | 3/1929 | Van Schaack et al. |
| 2,458,888 | 1/1949 | Rehberg et al. _____ 260—89.5 |
| 2,715,118 | 8/1955 | Grim. |
| 2,876,211 | 3/1959 | Cupery _____ 260—73 |
| 3,132,120 | 5/1964 | Graham et al. _____ 260—86.1 |

OTHER REFERENCES

Noller, Chemistry of Organic Chemistry, published by W. B. Saunders Company, (1951) pp. 169–170 (copy in Group 140).

JOSEPH L. SCHOFER, *Primary Examiner.*

HARRY WONG, *Assistant Examiner.*